J. S. COOPER.
LAND PULVERIZER.
APPLICATION FILED FEB. 24, 1916.

1,196,432.

Patented Aug. 29, 1916.
2 SHEETS—SHEET 1.

WITNESSES:
L. J. Forde
B. M. Doolin

INVENTOR
Joel. S. Cooper
BY Strong & Townsend
ATTORNEYS

J. S. COOPER.
LAND PULVERIZER.
APPLICATION FILED FEB. 24, 1916.

1,196,432.

Patented Aug. 29, 1916.
2 SHEETS—SHEET 2.

WITNESSES:
L. J. Forde.
B. M. Doolin.

INVENTOR
Joel S. Cooper
BY Strong & Townsend.
ATTORNEYS

UNITED STATES PATENT OFFICE.

JOEL S. COOPER, OF SANTA BARBARA, CALIFORNIA.

LAND-PULVERIZER.

1,196,432.    Specification of Letters Patent.    Patented Aug. 29, 1916.

Application filed February 24, 1916. Serial No. 80,211.

*To all whom it may concern:*

Be it known that I, JOEL S. COOPER, a citizen of the United States, residing at Santa Barbara, in the county of Santa Barbara and State of California, have invented new and useful Improvements in Land-Pulverizers, of which the following is a specification.

My invention relates to an apparatus for pulverizing and breaking up land for further cultivation.

It consists of a frame mounted upon bearing wheels, having traction points, a series of disks or drums journaled in front of the line of the bearing wheels and inside of the frame which is carried upon said bearing wheels, said disks having radially adjustable curved teeth projecting from the periphery and adapted to enter the ground, an arc-shaped guide fulcrumed about the bearing wheel axis, and means for locking said guide in any position of adjustment.

It also comprises means projecting between the teeth for continually cleaning them of accumulations of earth, means for cleaning the lead and bearing wheels, and adjustments by which the traction pins of the bearing wheels may be readily withdrawn when passing over hard roads.

Figure 1:
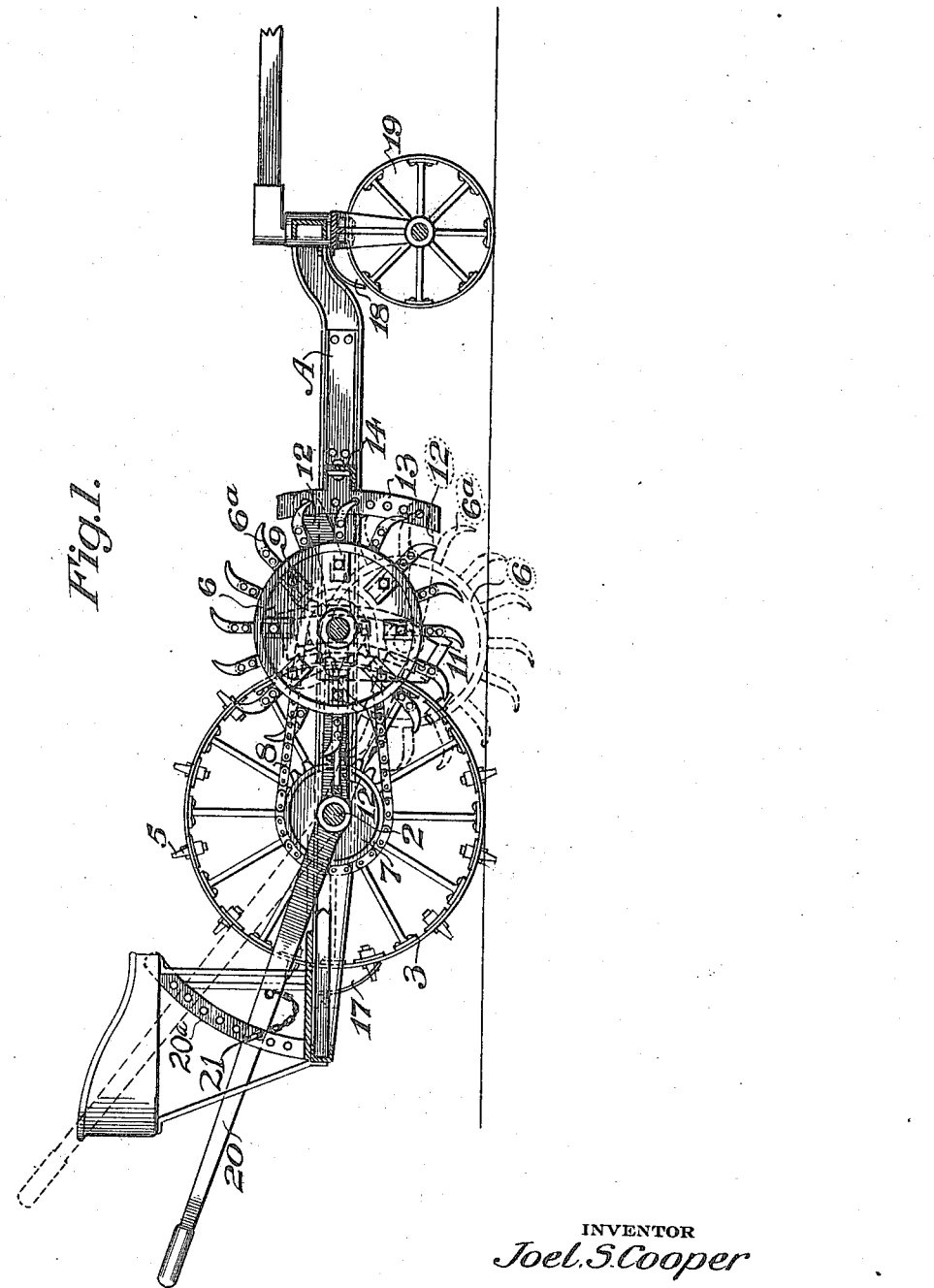
Figure 2:
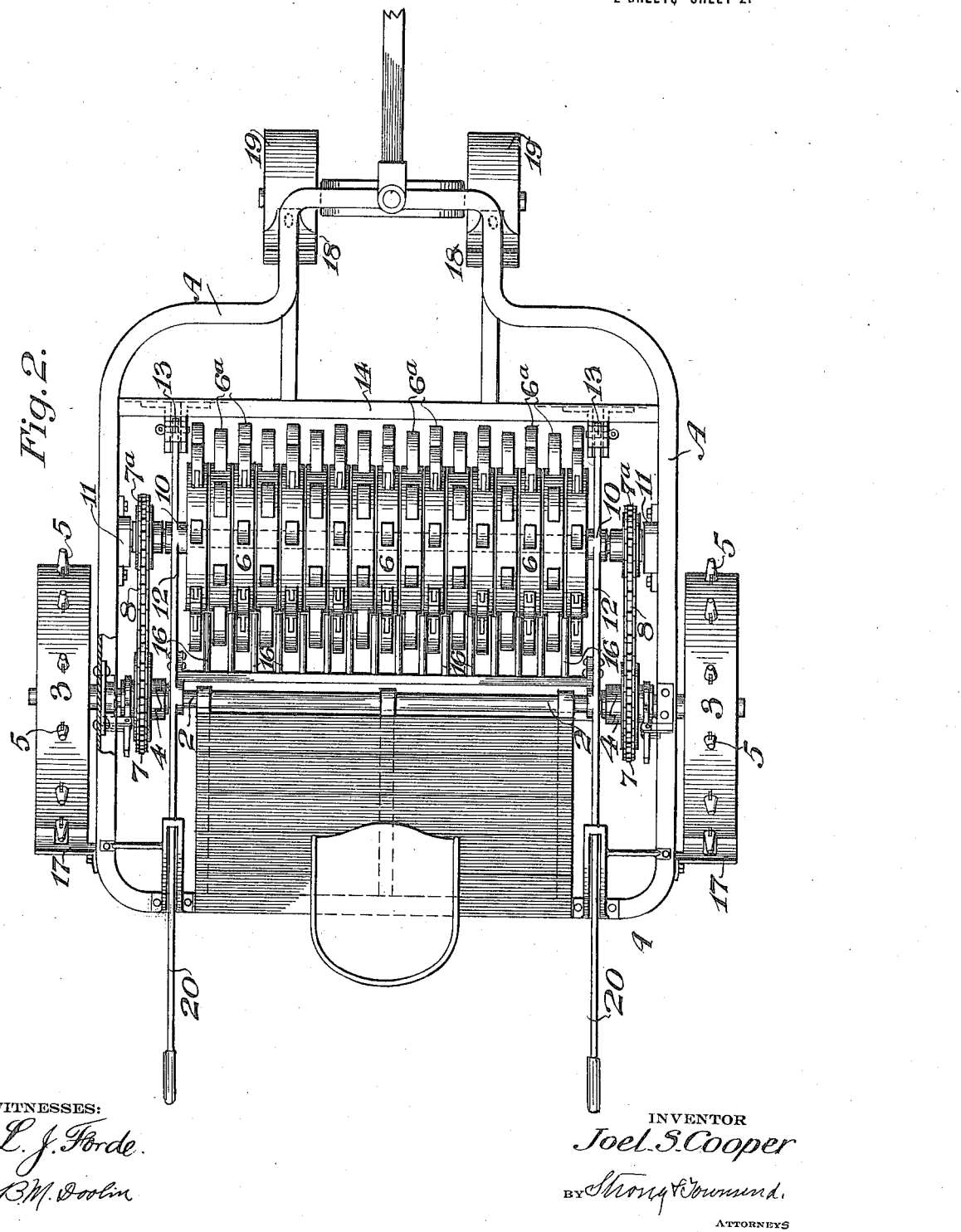

Having reference to the accompanying drawings: Figure 1 is a side elevation. Fig. 2 is a plan view of my apparatus.

This invention is designed to provide certain improvements in that class of agricultural implements known as rotary harrows and clod crushers.

As shown in the drawings, A is a frame, preferably made of angle iron, and this frame has an axle 2 extending across from one side to the other and provided with suitable bearings on the frame. Upon the ends of the axle are bearing wheels 3, the hubs of which may have yielding ratchet clutches 4 which act to produce differential movements; that is, to allow one wheel to run faster than another in turning corners or running out of a straight line. The peripheries of these wheels are provided with projecting spurs or means 5 to prevent the wheels from slipping and to provide the necessary traction. These are so secured in the rims of the wheel that they may be easily moved inwardly so as not to project from the face of the wheels and thus allow the vehicle to be transported over hard roads without injury to the road or wheels.

In advance of the wheel axle and journaled between the sides of the frame A are disks 6, set side by side and extending between the sides of the frame. These disks are adapted to carry the cultivating teeth $6^a$, the shanks of which project radially from the peripheries of the disks. The outer ends are curved, as shown, so that they will enter the ground and the rotation of the disks will tend to dig and loosen and lift the earth as the machine passes over the surface of the ground. The shaft of these disks is rotated by means of sprockets 7 and $7^a$, fixed respectively upon the bearing wheel shaft and the disk shaft, and a chain 8 passing around said sprockets near each end of the shafts and in such relation to the differential previously described that one or the other will be operated without reference to turns that may be made. The teeth of these disks are so arranged that they may be lengthened or shortened radially with relation to the disks and at any point of adjustment they may be fixed by means of set-screws or equivalent fastenings 9.

The shaft of the disks 6 is journaled in collars or boxes 10 formed or mounted on the radius bars 12 and the ends of the disk shaft are slidable in segments 11 which are fixed upon frame A. Radius bars 12 are fulcrumed upon the axle 2 which also serve as a center about which the segment 11 is curved. The bars 12, which carry the collars, extend on beyond, and at the end the bars are movable between fixed segments 13 having a radius of curvature corresponding with the length of the bars 12. These segments 13 are adapted to be secured to a cross bar 14 extending across the frame A. The upturned ends of the bars 12 may enter between segmental plates 13 fixed to the bar 14 which form channels for this purpose, and the segments 13 have a number of holes made in them through which pins may be introduced to secure the ends of the bars. By this means the disks, which carry the cultivating teeth, may be depressed to engage the teeth to a greater or less extent. This, together with the adjustment of the teeth, provides for a very perfect cultivation of the soil, and, when desired, the disks may be let down so that they rest upon the surface and act as pulverizers as well as diggers. In order to keep these teeth clear of accumulations which might clog them, I have shown arms 16 fixed to a bar 16ª which extends between the arms 12 and is capable of being raised and lowered with these arms. Scrapers 17 are fixed to clean the bearing wheels 3 and similar scrapers 18 serve to clean the forward wheels 19. Levers 20, convenient to the driver's seat, serve to raise and lower the toothed disks. The levers 20 extending behind the axle may be raised or depressed between guiding segments 20ª, fixed to the frame, and retained at any desired point by stop pins 21 or equivalent devices.

Having thus described my invention, what I claim and desire to secure by Letters Patent is—

1. The combination in an apparatus of the character described, of a frame, an axle and bearing wheels, a rotary toothed implement mounted on a shaft parallel to, and in front of, the wheel axle, segments fixed to the frame sides and acting as guides in which said shaft ends are movable, radius bars fulcrumed upon the wheel axle having bearings in which the shaft is turnable, and channeled segments fixed to the frame front, in line with the radius bars and in which the ends of said bars are guided and adjustable.

2. In an apparatus of the character described, a main frame with bearing and steering wheels, radius lever bars fulcrumed on the bearing wheel axle and extending forwardly from the fulcrums, channeled segments fixed to the frame front, means to adjust the front radius lever ends in said segments, journals carried by the levers, a shaft turnable therein, segments fixed to the frame sides in which the shaft ends are guided, a toothed implement mounted upon the shaft and means to transmit motion from the bearing wheels to the implement shaft.

3. A cultivator and pulverizer comprising a frame and bearing wheels, a toothed implement and a shaft therefor, radius bars fulcrumed upon the bearing wheel axle, and upon which the implement shaft is journaled, guiding segments fixed to the frame, in which the ends of the shaft are slidable, and other segments fixed in line with the front ends of the radius bars and about which said bars may be raised, lowered, and locked.

4. In an apparatus of the character described, the combination of a wheel borne frame and axle, a fixed bar in front of the axle, having forwardly projecting pins, a rotary toothed implement in front of said bar, the teeth of which project between the pins, radius arms fulcrumed upon the axle, and movable about the fulcrums, journal boxes upon said bars in which the implement axle turns, fixed segments in which the axle ends are guided and other segments in line with the radius arms, and in which said arms are guided and movable, and means connected with the axle, to rotate the implement.

In testimony whereof I have hereunto set my hand in the presence of two subscribing witnesses.

JOEL S. COOPER.

Witnesses:
JOHN H. HERRING,
W. W. HEALEY.

Copies of this patent may be obtained for five cents each, by addressing the "Commissioner of Patents, Washington, D. C."